(12) United States Patent
McGuinness

(10) Patent No.: US 7,040,771 B2
(45) Date of Patent: May 9, 2006

(54) BICYCLE REAR VIEW MIRROR

(76) Inventor: Tony McGuinness, 5 Hillbeck Grove, Middleton, Milton Keynes, MK10 9JJ (GB)

( * ) Notice: Subject to any disclaimer, the term of this patent is extended or adjusted under 35 U.S.C. 154(b) by 0 days.

(21) Appl. No.: 10/482,521

(22) PCT Filed: Jun. 27, 2002

(86) PCT No.: PCT/GB02/02972

§ 371 (c)(1),
(2), (4) Date: Jul. 12, 2004

(87) PCT Pub. No.: WO03/002400

PCT Pub. Date: Jan. 9, 2003

(65) Prior Publication Data

US 2004/0246602 A1    Dec. 9, 2004

(30) Foreign Application Priority Data

Jun. 29, 2001    (GB)    ................................ 0116010.0

(51) Int. Cl.
*G02B 5/08*    (2006.01)
*G02B 7/18*    (2006.01)
(52) U.S. Cl. ...................................... 359/842; 359/550
(58) Field of Classification Search ................ 359/550, 359/842, 872
See application file for complete search history.

(56) References Cited

U.S. PATENT DOCUMENTS

| 3,951,516 A | * | 4/1976 | Rihm ......................... 359/550 |
| 3,981,567 A | | 9/1976 | Cululi et al. |
| 3,995,945 A | | 12/1976 | Addicks |
| 3,997,184 A | * | 12/1976 | Riti ........................ 280/288.4 |
| 4,326,774 A | | 4/1982 | Beigl |
| 4,852,971 A | * | 8/1989 | Kitrell ....................... 359/550 |
| 5,259,582 A | | 11/1993 | DeLange, III |
| 5,563,742 A | | 10/1996 | Menz |

FOREIGN PATENT DOCUMENTS

| DE | 918735 | 10/1954 |
| DE | 43 24 501 C1 | 12/1994 |
| EP | 0 635 421 A1 | 7/1994 |

* cited by examiner

*Primary Examiner*—Mark A. Robinson
(74) *Attorney, Agent, or Firm*—Fay, Sharpe, Fagan, Minnich & McKee, LLP (57) ABSTRACT

A rear view bicycle mirror assembly (10) for attachment to a bicycle frame (3) comprising a mirror (14) and mounting body (12). The mounting body (12) comprising a mounting means for mounting the mirror onto the frame of the bicycle. The mounting means comprises a first mounting foot (18) for abutment and mounting on a first tube (6) of the bicycle frame, and a second mounting foot (24) for abutment and engaging a second tube (4) of the bicycle frame at an angle to said first tube and first mounting foot.

16 Claims, 8 Drawing Sheets

BICYCLE REAR VIEW MIRROR

The present invention relates to a rear view mirror for a bicycle.

A problem faced by all cyclists is that of watching traffic approaching from behind. Generally, a cyclist has to look back over his or her shoulder. This can be difficult and/or dangerous, possibly causing a cyclist to wobble. Racing cyclists may also want to watch competitors approaching from behind, but turning whilst racing can cause a loss of rhythm, disrupts the aerodynamic posture and can be difficult whilst exerting maximum effort on the pedals, all leading to an undesirable loss in performance.

As a result it has been proposed for cyclists to use rear view mirrors. One proposal is to fit and mount such mirrors on the handle bars of a bicycle. However such mirrors tend to stick out significantly of the sides of the bike, are cumbersome, and are not aerodynamic. Furthermore the mirrors will turn with the handle bars adversely affecting rearward view.

An alternative, arrangement is shown in U.S. Pat. No. 4,326,774 and U.S. Pat. No. 3,995,945 in which it is proposed to mount a mirror onto the front forks of the bicycle. Whilst this is less cumbersome than handle bar mounting of the mirror, this arrangement still suffers from the problem of the mirror turning when the bike turns corners.

It has also been proposed, for example in U.S. Pat. No. 3,981,567 and U.S. Pat. No. 5,563,742, to provide and mount a relatively large rear view mirror on the frame of a bicycle, with the mirror extending laterally either side of, and over, the frame to which it is mounted in order to provide a rear view. In these arrangements a clamping means is provided to clamp a mirror in position on a tube of the bike frame. A problem with such arrangements is that the mirror and clamping mounting arrangement can twist, in use, about the generally cylindrical frame tube with the result that the mirror twists out of position, and even worse may foul other parts of the bike (wheels/pedals etc) or the rider. Furthermore the tubes of bike frames have a wide variety of different dimensions and may even have elliptical cross sections leading to difficulties with such clamping arrangements. In addition the mirrors proposed have a significant area and are therefore undesirable from an aerodynamic or convenience perspective.

A further problem with some of the prior arrangements relates to the securing of the angular position of the mirror. Typically there is a mounting which attaches the mirror assembly to the bike frame whilst the mirror is then adjustably secured to the mounting. This allows the angular position of the mirror to be adjusted to provide good rearward visibility with the mirror being held in position by frictional engagement. For example in U.S. Pat. No. 5,563,742, U.S. Pat. No. 4,326,724 and U.S. Pat. No. 3,995,945 the mirror is secured to the mounting via a ball and socket arrangement. Consequently in use the mirror position can alter and in some cases can move to a position where it may foul the rider or some part of the bike. In U.S. Pat. No. 3,981,567 an alternative arrangement is used with the mirror held in position about a pivot axis by frictional clamping alone.

It is therefore desirable to provide an improved rear view mirror for a bicycle which addresses the above described problems and/or which offers improvements generally. In particular it is desirable to provide an improved bicycle rear view mirror which is securely mountable to a bicycle frame, is easy and quick to fit, lightweight, and does not damage the bike frame. Furthermore and/or alternatively it is desirable to provide an arrangement in which the mirror is more securely held in position.

According to the present invention there is provided a bicycle rear view mirror as described in the accompanying claims.

In an embodiment of a first aspect of the invention there is provided a rear view bicycle mirror assembly for attachment to a bicycle frame comprising a mirror and mounting body comprising a mounting means for mounting the mirror onto the frame of the bicycle. The mounting means comprises a first mounting foot for abutment and mounting on a first tube of the bicycle frame, and a second mounting foot for abutment and engaging a second tube of the bicycle flame at an angle to said first tube and first mounting foot.

In such an arrangement the rear view mirror can be securely located on the frame of a bicycle in a simple convenient and effective manner.

The mirror is preferably pivotally attached to said mounting body and mounting means. The pivotal mounting preferably comprises a pin which defines a pivot axis about which the mirror pivots.

Additionally the pivotal attachment of the mirror and mounting means may include a pivotal movement stop which restricts the pivotal movement of the mirror with respect to the mounting means.

The pivotal movement stop prevents the mirror from pivoting to a position where it may undesirably foul other parts of the bicycle and/or rider and also ensures the mirror is generally in the correct angular position.

Such an arrangement allows adjustment of the mirror to the required angle for rearward viewing by a rider.

The mirror is preferably attached to one side of the mounting means such that when the assembly is fitted to the bicycle frame the mirror is disposed laterally to one side of the frame.

Such lateral, offset, mounting of the mirror conveniently positions the mirror such that a clear unobstructed rearward view can be achieved without being obscured by the frame and allows a smaller less obtrusive mirror to be used as well as locating the mirror in a less obtrusive position.

The first mounting foot has a curved profile which defines a curved abutment surface for, in use, abutment against the first tube of the bicycle. Furthermore the second mounting foot has a curved profile which defines a curved abutment surface for, in use, abutment against the second tube of the bicycle.

This curved profile locates the mounting to the tubes of the bicycle frame.

The first mounting foot is advantageously flexible and is capable of deforming to an outer profile of the first tube. As such the mounting can be fitted securely to different shapes and sizes of frame tubes.

In the preferred embodiments the first mounting foot is adapted to abut and mount against a down tube of the bicycle frame and the second mounting foot is adapted and arranged to abut and mount against a head tube of the bicycle frame.

In an embodiment of a second aspect of the invention there is provided a rear view bicycle mirror assembly for attachment to a bicycle frame comprising a mirror and a mounting arrangement for mounting the mirror to the frame of the bicycle. The mounting means comprises a pin which projects laterally from the bicycle frame and upon which the mirror is pivotally mounted. The pivotal mounting of the mirror and pin includes cooperating engagement means which in use are cooperatively engaged and restrict the pivotal movement of the mirror with respect to the pin.

The cooperating engagement means restricts and secures the angular pivotal position of the mirror and prevents the mirror from pivoting to a position where it may undesirably foul other parts of the bicycle and/or rider and also ensures the mirror is generally in the correct angular position.

The cooperating engagement means when engaged permit limited degree of pivotal movement.

In this way a limited adjustment of the angular position of the mirror is provided whilst the mirror is still secured and prevent from pivoting too far to a position where it may foul the rider or other parts of the bicycle.

The cooperating engagement means may comprise a tang which engages within a recess. Preferably the tang projects from the pin and the recess is defined within a mirror element assembly. The said recess may comprise an arcuate recess thereby permitting a limited degree of pivotal movement. The said recess may comprise a plurality of discrete recesses in which the tang engages a respective recess in order to secure the mirror in the required position.

The pin may be adapted to be engaged within an aperture of bike frame. Preferably the pin comprises a hexagonal head portion and the said aperture is of a cooperating hexagonal profile.

The aperture may be defined within the bicycle frame. Alternatively the aperture may be defined in a mounting boss attached to the bicycle frame.

The present invention will flow be described by way of example only with reference to the following figures in which.

Figure 1:
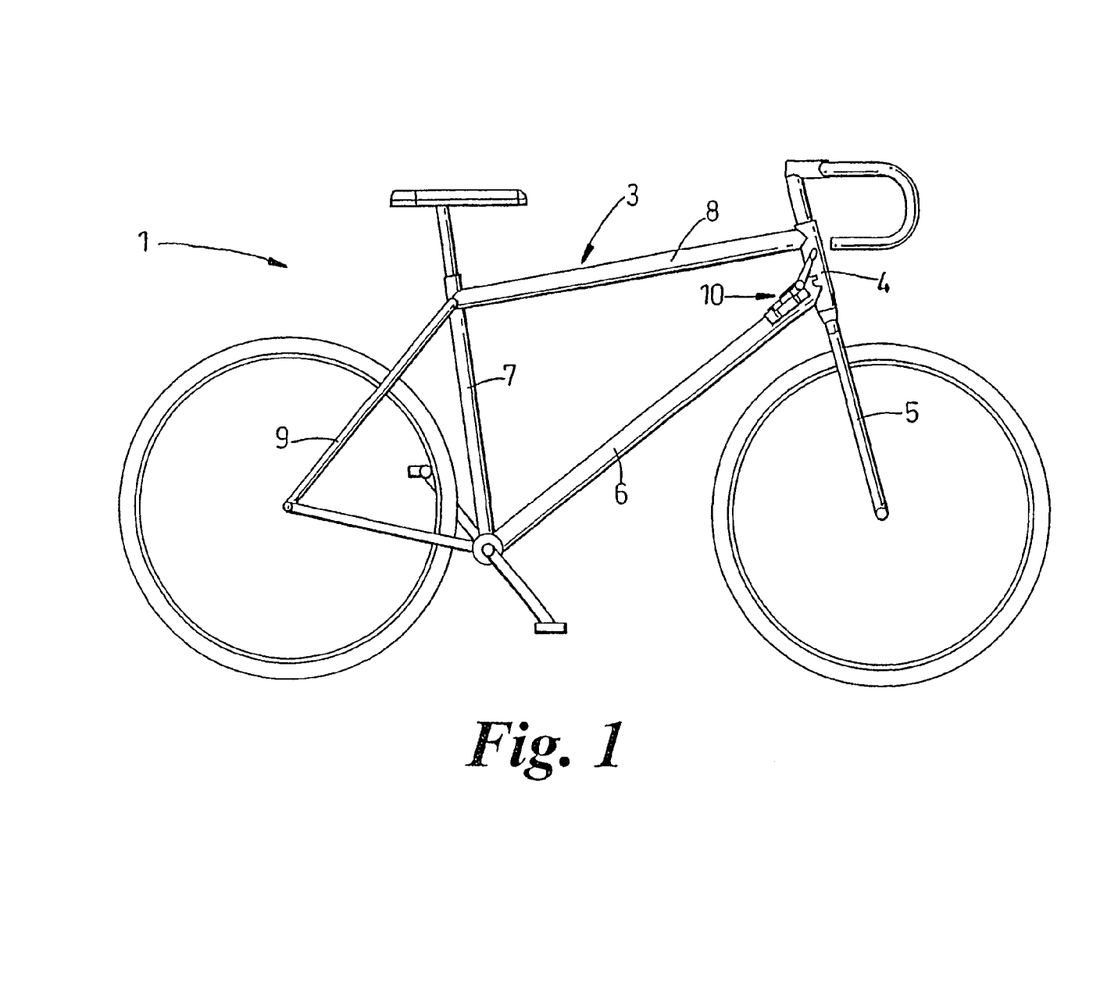
FIG. 1 is a schematic side view of a bicycle fitted with a bicycle rear view mirror of an embodiment of the present invention.
Figure 1A:
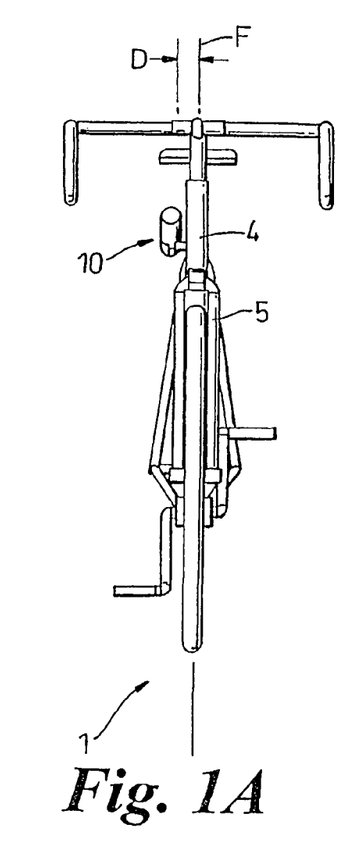
FIG. 1a is a front view of the bicycle of FIG. 1.

Referring to FIG. 1, a typical conventional bicycle 1 includes a frame 3 consisting of a number of tubular members 4,6,7,8,9 and in this case including a cross bar 8, seat tube 7, down tube 6, rear forks 9 and head set (or steering) tube 4 all joined (welded) together. The head set tube 4 supports rotatably locates a pair of front forks 5 for supporting the front wheel.

Figure 2:
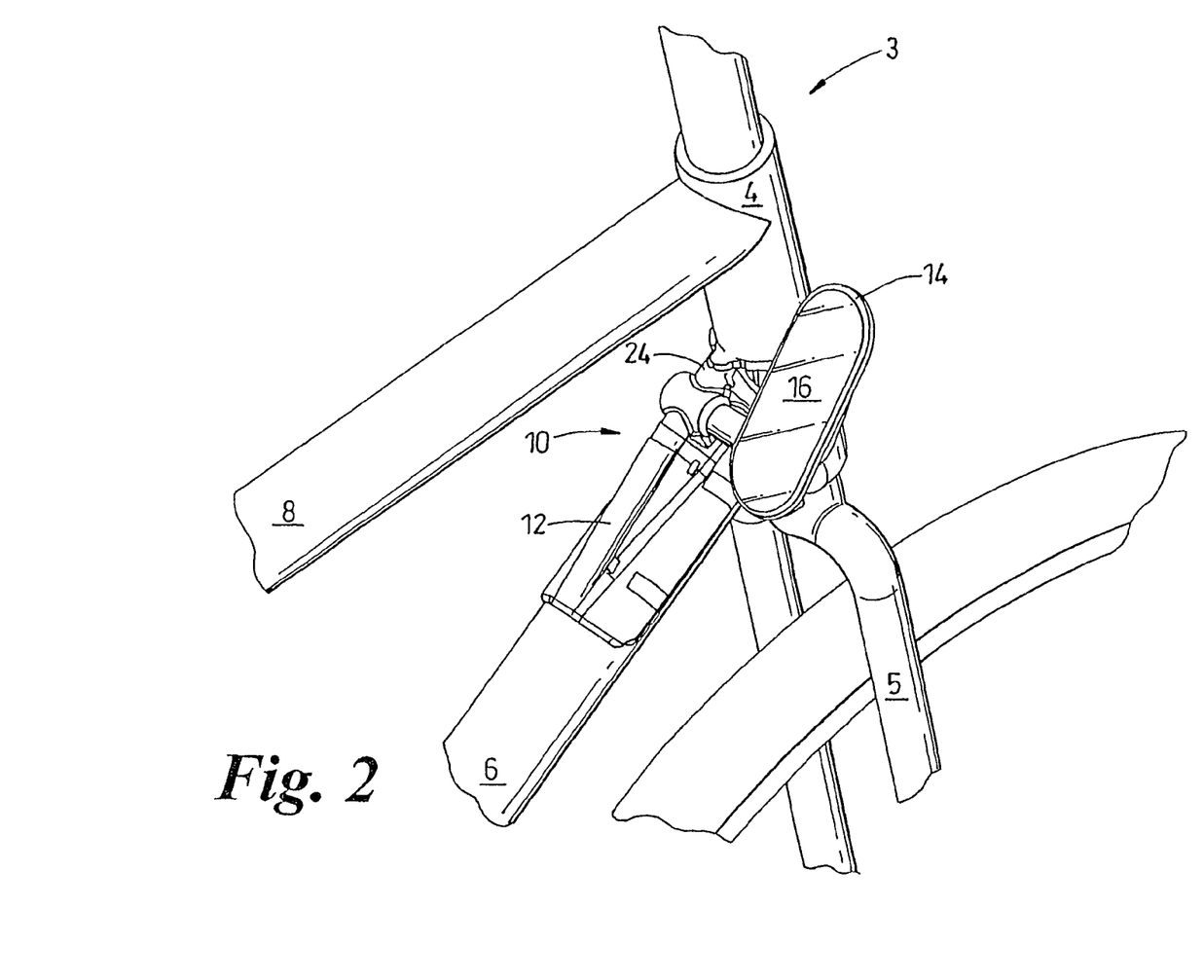
FIG. 2 is a more detailed perspective view of the bicycle rear view mirror fitted to the bicycle of FIG. 1.

A rear view mirror assembly 10 is mounted on the bike frame 3, towards the upper forward end of the down tube 6, at the juncture of the down tube 6 and head tube 4. The rear view mirror assembly 10 mounted upon the frame 3 is shown in more detail in FIG. 2. The rear view mirror assembly 10 comprises a main mounting body 12, which extends longitudinally along part of the down tube 6 and attaches and mounts the assembly 10 to the frame 3, and a mirror element assembly 14, including a reflective mirror element 16, pivotally attached to the main mounting body 12. The mirror element 14 is disposed laterally of, and offset D from, the main mounting body 12 and plane F of the frame 3. The mirror element assembly 14 is angled such that a rider looking down into the mirror element 16 can see to the rear between the frame and riders leg. Typically the mirror element 16 is angled, when mounted upon the bicycle 1, so that a line normal to the surface of the mirror element 16 is substantially parallel to frame 3 and angled upwards and rearwards at an angle of approximately 45° to the horizontal (i.e. with the mirror element at an angle of 45° to the horizontal).

The rear view mirror assembly 10 of this embodiment of the invention is shown in isolation in more detail in FIGS. 3 to 7.

The main body 12 of the rear view mirror assembly 10 includes a main mounting foot 18 disposed longitudinally along the base of the main body 12. The main mounting foot 18 comprises flange side projections 19a,19b which project laterally from each side of the base of the main body 12 and away from the base of the main body 12 in a curved arcuate manner to define a curved mounting abutment surface 20. This curved abutment surface 20 generally corresponds to the curved outer profile of a down tube 6 such that the main body 12 is located on the down tube 6 by the mounting foot 18 with the mounting foot 18 and flange sides 19a, 19b straddling the down tube 6 and extending part way around the outer circumference of the down tube 6. In effect the curved profile of the mounting foot 18 clips over the down tube 6 to locate the main body 12 on the down tube 6.

To secure the main body 12 and mounting foot 18 to the down tube 6 a pair of strap means (not shown) are provided which pass the through locating ports 22 in the main body 12 and extend over the mounting foot 18 and around the down tube 6. Recessed strap channels 23 are defined in the exterior of the side flanges 19a,19b to further locate and position the straps. The straps preferably comprise plastic tie wraps or cable ties which can be tightened and locked in a tightened position, although other similar strap means could be used. When tightened and secured the straps urge and hold the mounting foot in abutment with the down tube 6, thereby securing the main body 12 to the down tube 6.

The main body 12 also includes a second, anti rotation, mounting foot/collar 24. This anti rotation collar 24 is disposed towards one end of the main body 12 and is arranged in use to abut and engage against the head tube 4 of the bicycle frame 3 when the main body 12 is fitted to the bicycle 1. The anti rotation collar 24 is of a similar configuration to the main mounting foot 18 although considerably shorter, and comprises a pair of flange mounting arms 25a,25b which project and extend from the main body 12 in a curved arcuate manner to define a part collar and curved abutment surface 26. The anti rotation collar 24 is disposed at an angle to the main body 12 and main mounting foot 18 with the collar 24 and curved abutment surface 26 disposed at an angle to the longitudinal axis of the main body 12 and to the main mounting foot 18. The anti rotation collar 24 projects in a generally forwards longitudinal direction. When fitted to the bicycle 1 the anti rotation collar 24 abuts against the outer profile of the head tube 4 with the arms 25a,25b of the collar 24 straddling the head tube 4 and extending part way around the part of the outer circumference of the head tube 4. In effect the anti rotation collar clips, at least part way, around and engages the curved outer profile of the head tube 4.

The engagement of the anti rotation collar 24 with the head tube 4, at an angle to the main mounting foot 18 and down tube 6, further locates the main body 12 with the anti rotation collar 24 preventing the main body 12 and main mounting foot 18 from rotating about the down tube 6. In this way the main body 12 is securely located on the frame 3. In addition, and in a similar way to with the main mounting foot 18, a further securing strap (not shown) passes through a locating port 28 around the outside of the collar 24 within recessed strap channels 29 in the collar arms 25a, 25b and around the head tube 4. This strap secures the collar 24 to, and in abutment with, the head tube 4, thereby ensuring and urging the collar 24 into engagement with the head tube 4. This strap and the collar 24 also locates and secures the axial position of the main body 12 along the down tube 6 preventing the main body 12 from in use sliding along the down tube 6. In this way and using the combination of main mounting foot 18 and anti rotation collar 24 to provide a mounting means for the main body 12 in engagement with the down 6 and head 4 tubes and at different respective angles to each other, the main body 12, and so rear view mirror assembly 10, is securely, and accurately located and secured to the frame 3.

The angle of the mounting collar 24 to the main mounting foot 18 and longitudinal axis of the main body 12 operatively generally corresponds to the angle between the down tube 6 and head tube 4 such that when fitted both abutment surfaces 20,26 of the main mounting foot 18 and collar 24 abut against the respective exterior circumferences of the down tube 6 and head tube 4. The angle between the down tube 6 and head tube 4 does not tend to vary considerably from bike to bike and so the assembly 10 can be used on a wide range of different bikes 1, with any variation in the angles between the head 4 and down 6 tubes being accommodated with the tolerance of the mounting. Alternatively, the collar 24 could be pivoted with respect to the main body 12 such that the angle of the collar 24 to the main mounting foot and main body can be varied and adjusted to fit on frames 3 with different angles between the head and down tubes 4/6. It will also be appreciated that the main body 12 and rear view mirror assembly 10 could be located elsewhere on the frame 3 at the juncture of other frame tubes, for example at the juncture of the cross bar 8 and head tube 4. Locating the assembly 10 at the juncture of the down tube 6 and head tube 4 is though the most preferable and convenient location.

The main body 12 and in particular the mounting foot 18 and anti rotation collar 24 are preferably fabricated from a moulded resilient plastic material, for example ABS. Consequently the mounting foot 18 and collar 24 can deform and flex to conform to the outer profile of the down tube 4 and head tube 6 when fitted and secured to the frame 3. The assembly 10 can therefore be fitted to a wide variety of bike frames with varying shapes (circular, oval) and sizes of frame tubes with the resilience accommodating these variations. Fabricating the main parts from moulded plastic is also relatively cheap.

The mirror element assembly 14 is pivotally attached to the main body 12. The pivotal mounting of the mirror element assembly 14 to the main mounting body 12 allows the angle of the mirror element 16 to be adjusted for a particular bicycle 1 and rider. In particular such pivotal angular adjustment is required since the down tubes 6 of different bicycles 1 and to which the assembly 10 is mounted may be at different angles such that the respective angle of the mirror element assembly 14 to the main body 12 has to be adjusted in order that the mirror element 16 is at the correct operative angle.

The pivotal mounting of the mirror element assembly 14 is provided by a laterally extending mounting pin 30 which is located within a laterally extending bore 41 defined in the main body 12. The mounting pin 30, which includes shaft 32 with a hexagonal head 34 at one end, is cooperatively engaged within this bore 41 with the head 34 engaged within a hexagonal head engaging enlarged end portion 42a of the bore 41. The engagement of the hexagonal head 34 prevents rotation of the pin 30. The pin 30 is thereby engaged within the main body 12 with the shaft 32 of the pin 30 extending through the bore 41 and projects laterally from one side (as shown right hand side when viewed in a forward direction) of the main body 12. A distance tube 36 is fitted onto the projecting shaft 32 of the pin 30. One end of the distance tube 36 comprises a hexagonal head 38 which is engaged within a hexagonal head engaging enlarged portion end 42b of the bore 41 identical to the a hexagonal head engaging enlarged portion 42a at the other end of the bore 41 within which the head 34 of the pin 30 is engaged, with the distance tube 36 being engaged in a similar manner. The other end of the distance tube 36 stops short of the end of the shaft 32 of pin 30 and includes a tang 40 projecting from this end of the distance tube 36.

The mirror element assembly 14 comprises a mirror element 16, for example a silvered glass mirror, which is mounted within a cooperatively shaped recess 52 defined within a support housing 54 and enclosing the periphery of the mirror element 16. The housing 54, which supports the mirror element 16 also encloses the rear surface of the mirror element 16 with the outer profile of the housing having a smooth curried aerodynamic profile. The recess mounting of the mirror element 16 encloses the peripheral edges of the mirror element 16 protecting the mirror element 16 with the mirror element 16 being set back within the recess 52 in housing 54. The housing 54 is preferably fabricated from a moulded plastic, for example ABS. Such a plastic material is relatively tough and so protects the mirror element. A plastic moulding is also relatively cheap, making the assembly 10 as a whole cheap to produce.

Figures 3, 4:
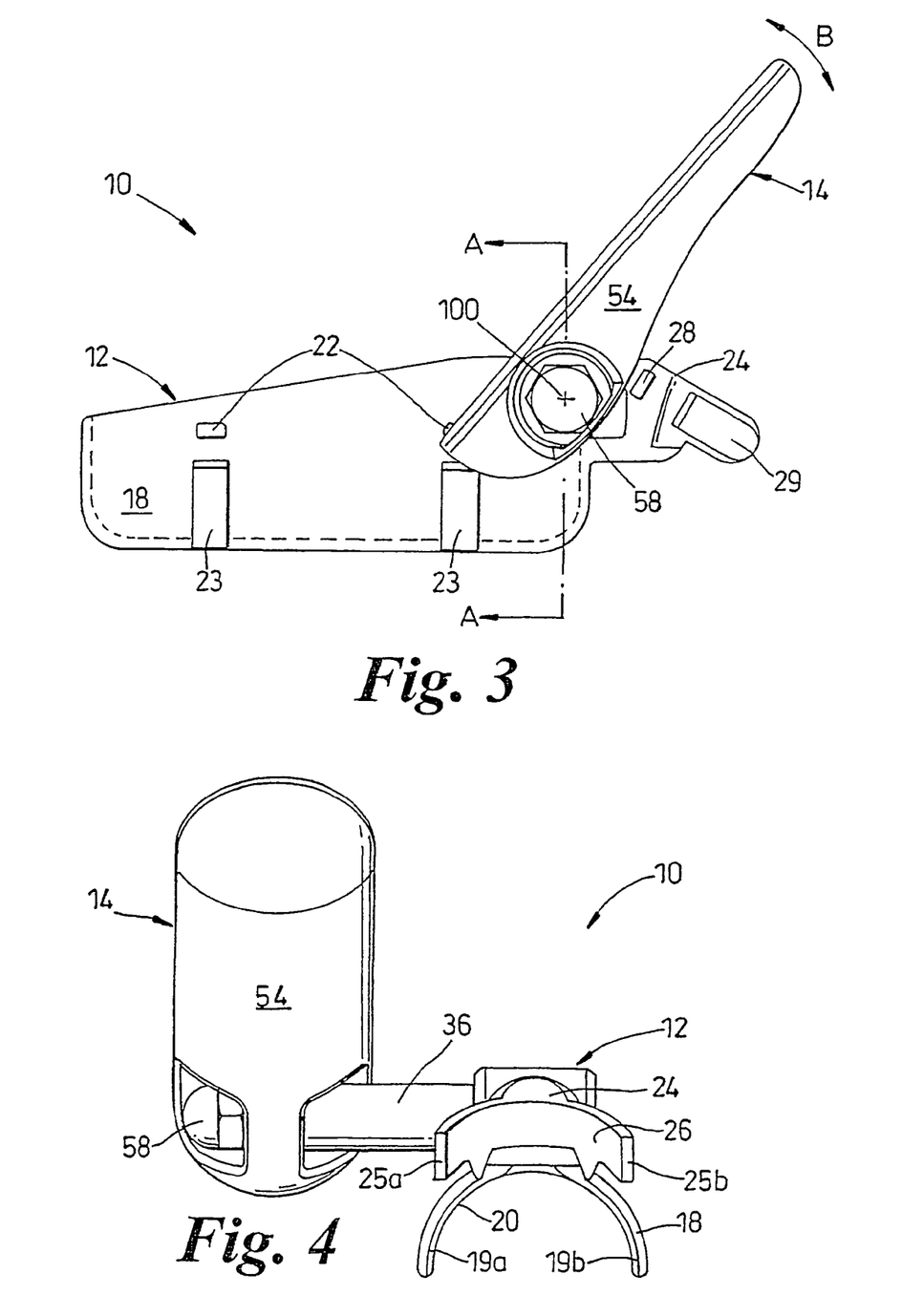
FIGS. 3 and 4 are respectively detailed side and front elevations of the bicycle rear view mirror.
Figure 5:
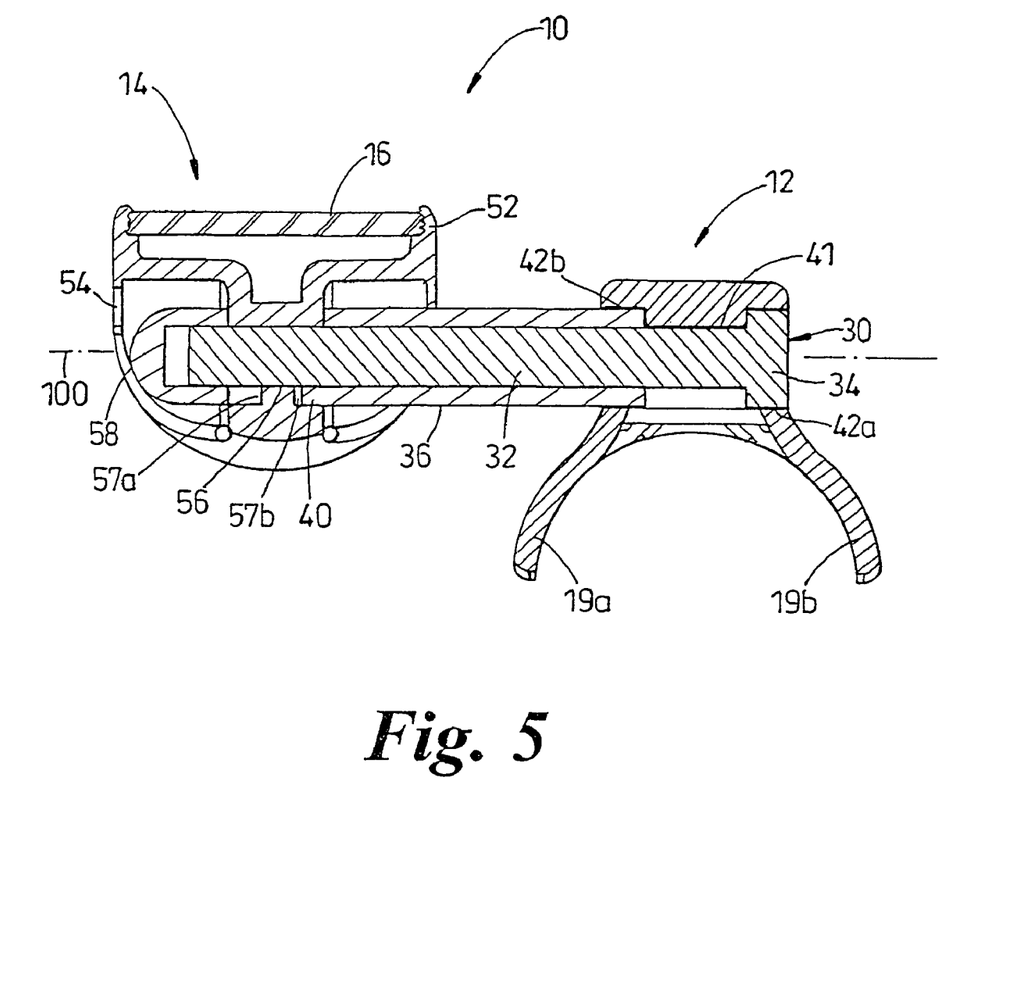
FIG. 5 is a cross sectional illustration of the bicycle rear view mirror assembly along line A—A of FIG. 3.
Figure 6:
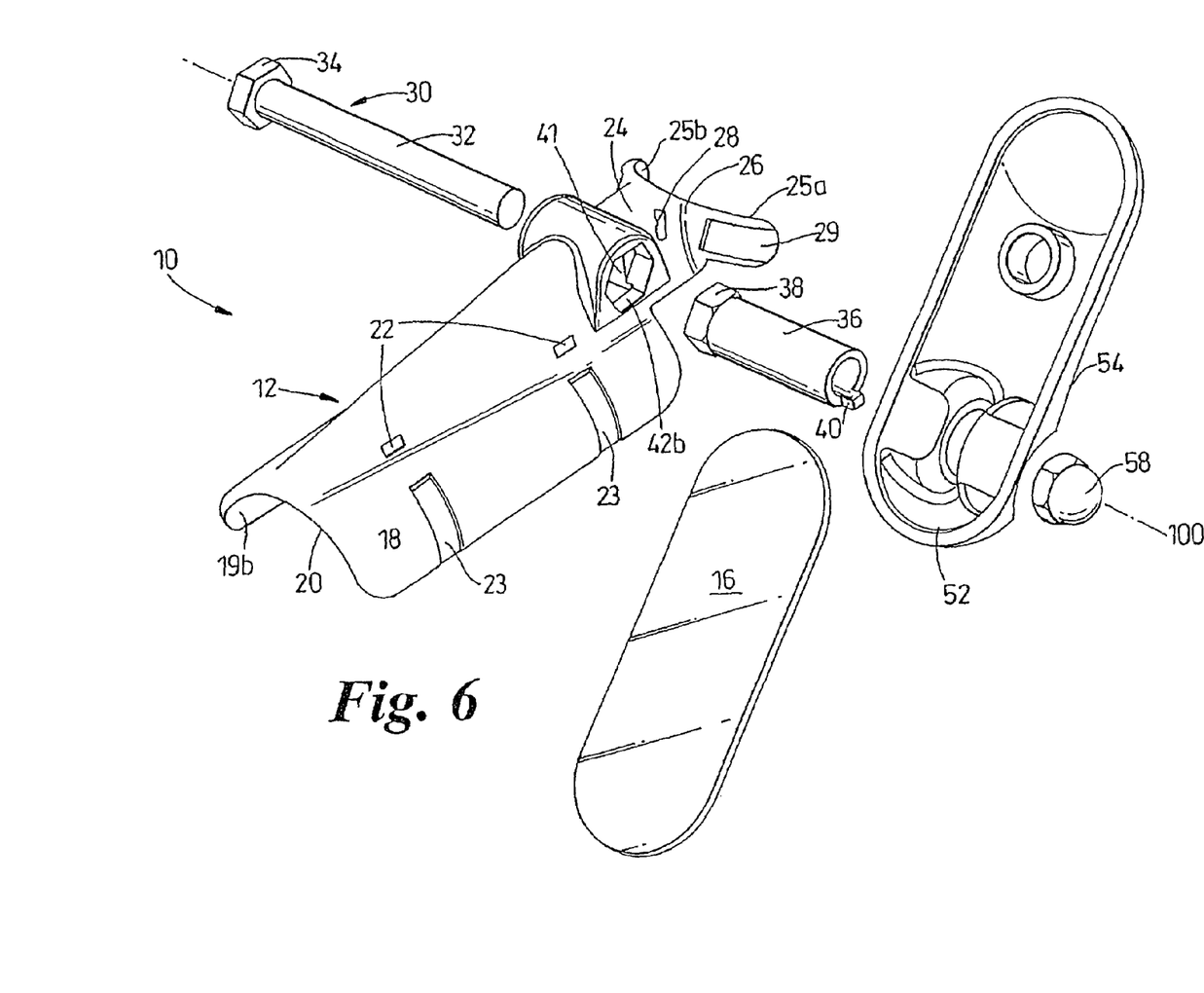
FIGS. 6 and 7 are an exploded perspective illustrations of the bicycle rear view mirror assembly of the embodiment of the present invention.
Figure 7:
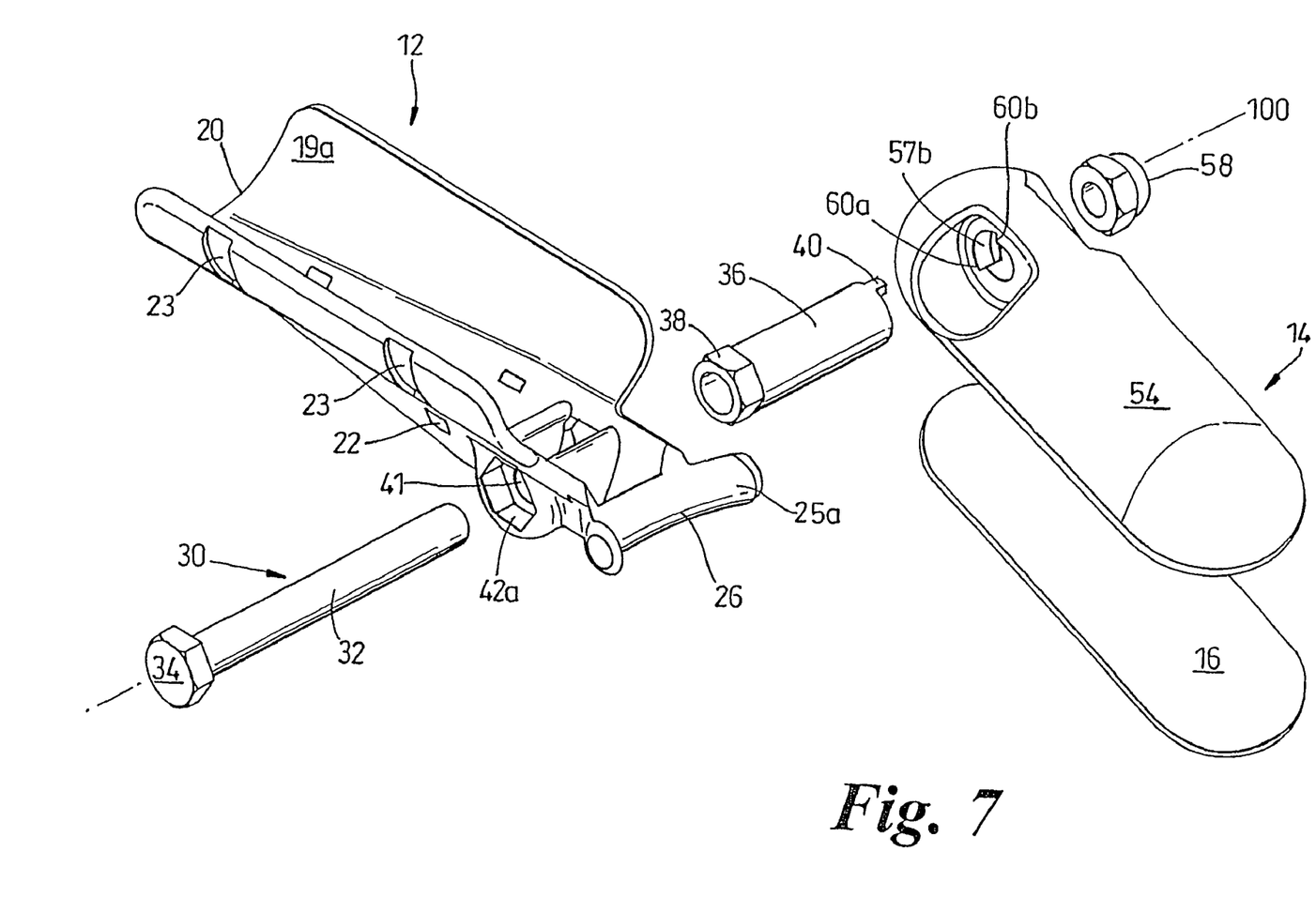

The mirror assembly 14 is pivotally mounted to the main body 12 upon the pin 30 such that the mirror assembly 14 can pivot about the pin axis 100, as indicated by arrow B in FIG. 3. The projecting end of the pin 30 extends though and is cooperatively engaged within a laterally extending bore 56 defined within a lower portion of the mirror assembly housing 54, behind the mirror element 16. The end face of the distance tube 36 abuts against the housing 54 thereby spacing the mirror element assembly 14 along the pin 30 and laterally from the main body 12. The distance tube 36 setting the optimum offset distance D for the mirror assembly 14 from the frame 3 of the bicycle. The distal tip of the pin 30 extends through and projects from the housing bore 56. The mirror element assembly 14 is secured onto the pin 30 by a locking nut 58 which is fitted onto a threaded distal end of the pin 30. The locking nut 58 also maintains engagement of the head 34 of the pin and head 38 of the distance tube 36 within the main body 12. When the locking nut 58 is tightened a load is applied along the axis 100 of the pin 30 and the mirror element assembly 14 is frictionally clamped between the locking nut 58 and distance tube 36 thereby preventing pivotal movement of the mirror element assembly 14 about the pin axis 100 and fixing the angular position of the mirror element assembly 14.

Over an arcuate sector of the circumference of either end of the bore 56 the radius of the bore 56 is increased to define an arcuate locating channel 57a,57b. The projecting tang 40 of the distance tube 36 is located within this arcuate locating channel 57b such that pivotal movement of the mirror element assembly is restricted to the sector angle of the arcuate channel 57b by abutment of the tang 40 with the shoulder ends 60a,60b of the arcuate channel 57b. The shoulder ends 60a,60b provide end stops for the pivoting of the mirror element assembly 14 about the pin axis 100. In this way the mirror assembly 14 is prevented from pivoting too far to a point where it may undesirably foul the rider or other parts of the bicycle 1.

The angular position of the tang 40 relative to the assembly as a whole is fixed and set by the engagement of the hexagonal end 38 of the distance tube 36 with the mounting body 12. The angular position of the tang 40 relative to the mounting can though, if required for example when fitted to differing bike frames, be adjusted by disassembling the assembly and clocking the distance tube 36 round such that the hexagonal end portion 38 of the distance tube 36 engages the hexagonal aperture of the mounting body 12 with the tang 40 in a different angular position. The re-engagement of the hexagonal end portion 38 of the distance tube then securing the distance tube 36 and tang in a rotated angular position.

In alternative embodiments the arcuate locating channel 57a,57b could be replaced by discrete individual locating recesses around the bore 56 circumference with the tang 40 selectively engaging a respective recess to set the angular position of the mirror element assembly 14 with respect to the pin axis 100. In such a case the pivotal position and angle of the mirror assembly 14 is determined by the position of the respective locating recess and the mirror assembly 14 is more securely held in the correct angular position than simply relying on the frictional clamping load provided by the locking nut 58, which in use may loosen in use due to vibration. The locating channel 57a,57b or recesses could also alternatively comprise separate apertures within the housing 54 rather than enlarged portions of the bore 56.

Figure 8:
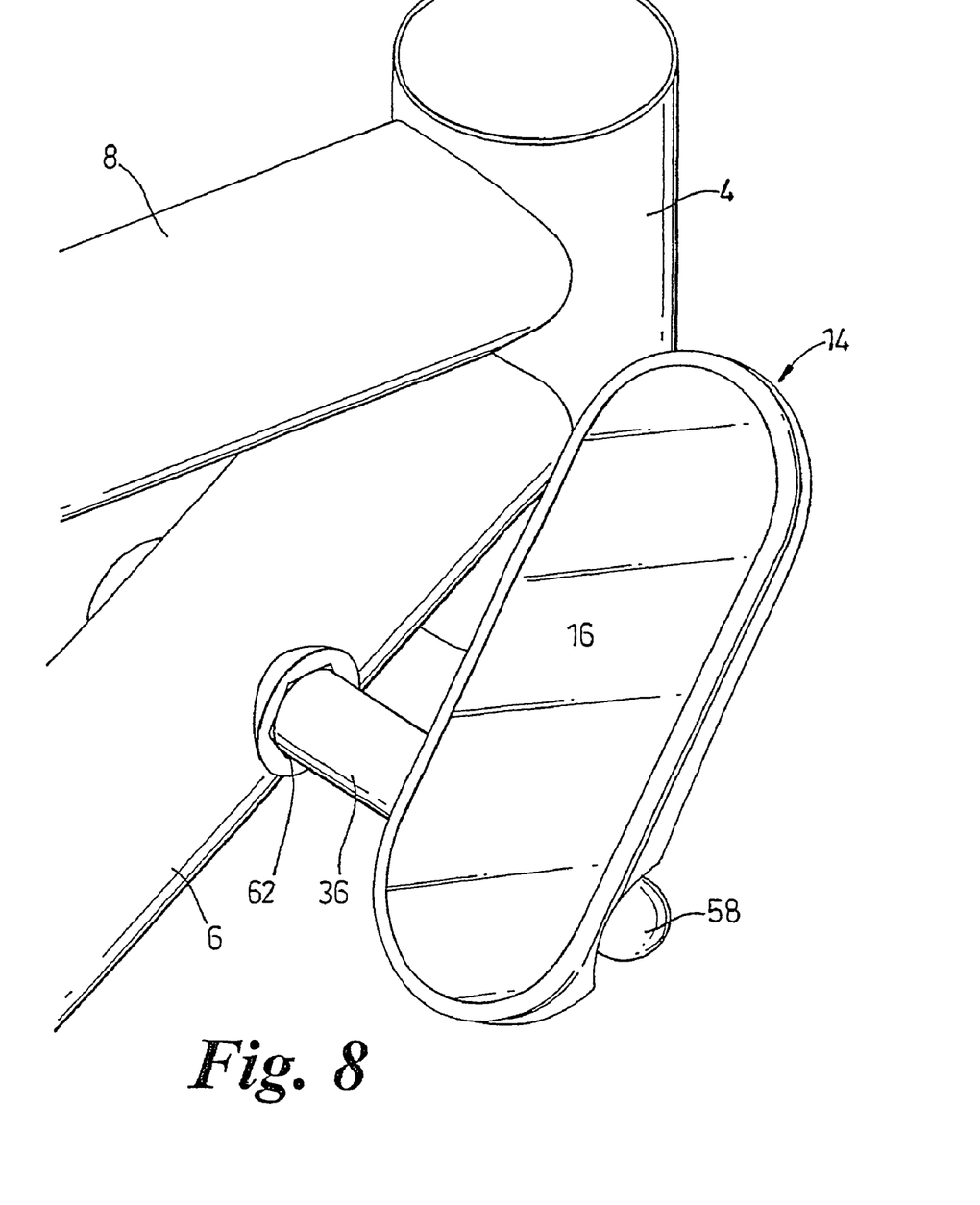
FIG. 8 is a perspective view of a second embodiment of the invention showing the attachment of the mirror to the bicycle through an aperture in the bicycle frame.
Figure 9:
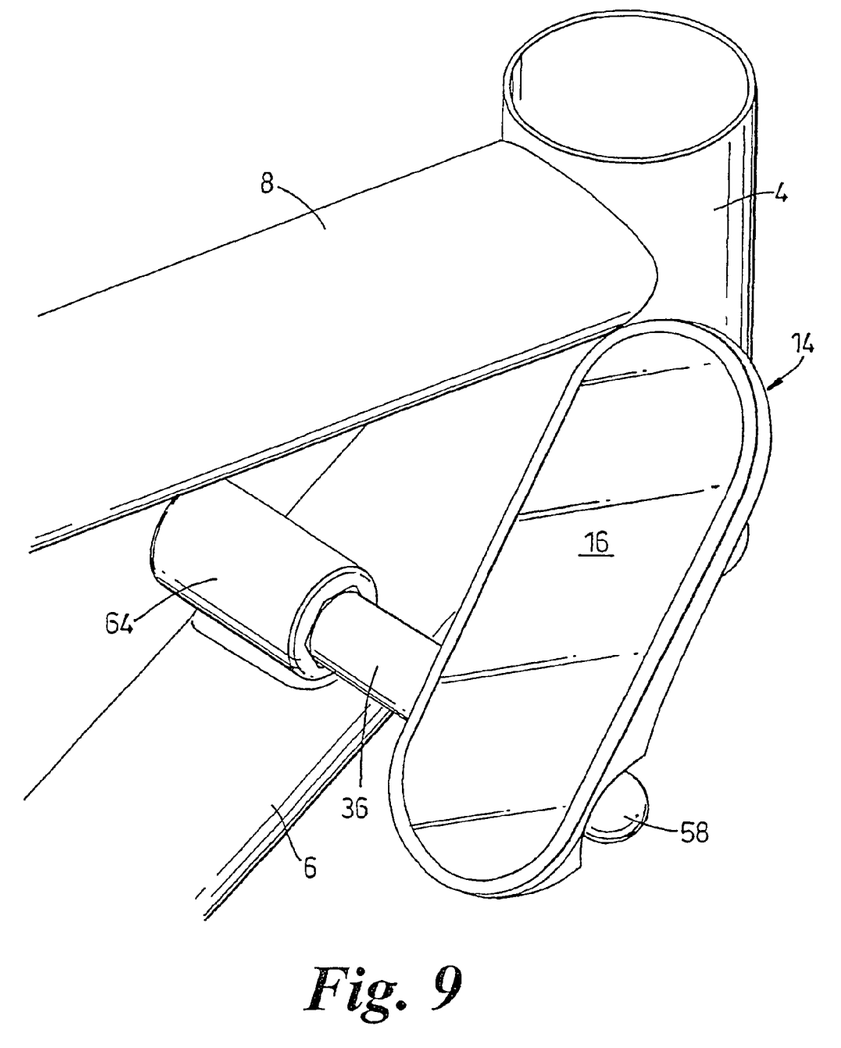
FIG. 9 is a perspective view of another embodiment of the invention showing the attachment of the mirror to the bicycle by means of a mounting boss.

The pivotal mounting arrangement of the mirror element assembly 14 via the pin 30 and the use of a tang 40 engaged within a recess 57a,57b to limit pivotal angular movement are significant features and aspect in itself. Accordingly in alternate embodiments of this aspect alone of the invention, the pin 30 and distance tube 36 arrangement could be directly attached or mounted to the bicycle frame 3 without the mounting body 12 described above. For example, in the embodiment as shown in FIG. 8, there is a hexagonal aperture 62 through the bicycle frame within which the pin 30 and distance tube 36 are located. Alternatively, as shown in FIG. 9, the bicycle frame 3 includes amounting boss 64 within which an aperture is defined into which the pin 30 and distance tube 36 are engaged. The mounting boss 64 may be welded to or integral with the frame 3.

The mirror assembly 14 is preferably mounted upon the offside of the frame 3. For example, on a bicycle 1 for use in countries where vehicles drive on the left hand side of the road the mirror assembly 14 it is disposed on the right hand side of the frame 3, as shown. In countries where vehicles drive on the right hand side of the road, the mirror assembly 14 would though normally be mounted on the left hand side of the frame 3. With the above arrangement this can easily be achieved using the same components by simply fitting the mounting pin 30 and distance tube 36 such that they project from the other side of the main body 12, with the locating recesses, 42b, 42a, 57a, 57b all being provided on both respective sides of the bore 41 of the main body 12 and bore 56 of the mirror assembly 14.

The invention claimed is:

1. A rear view bicycle mirror assembly for attachment to a bicycle frame comprising a mirror and mounting body comprising a mounting means for mounting the mirror onto the frame of the bicycle; wherein the mounting means comprises a first mounting foot for abutment and mounting on a first tube of the bicycle frame, and a second mounting foot for abutment and engaging a second tube of the bicycle frame at an angle to said first tube and first mounting foot.

2. The rear view bicycle mirror assembly of claim 1 in which the mirror is pivotally attached to said mounting body and mounting means.

3. The rear view bicycle mirror assembly of claim 2 in which the mirror is pivotally mounted via a pivotal mounting comprising a pin which defines a pivot axis about which the mirror pivots.

4. The rear view bicycle mirror assembly of claim 3 in which the pivotal mounting of the mirror and mounting means includes a pivotal movement stop which restricts the pivotal movement of the mirror with respect to the mounting means.

5. The rear view bicycle mirror assembly of claim 1 in which the mirror is attached to one side of the mounting means such that when the assembly is fitted to the bicycle frame the mirror is disposed laterally to one side of the frame.

6. The rear view bicycle mirror assembly of claim 1 in which the first mounting foot has a curved profile which defines a curved abutment surface for, in use, abutment against the first tube of the bicycle.

7. The rear view bicycle mirror assembly of claim 1 in which the second mounting foot has a curved profile which defines a curved abutment surface for, in use, abutment against the second tube of the bicycle.

8. The rear view bicycle mirror assembly of claim 1 in which the first mounting foot is profiled to, in use, straddle the first tube.

9. The rear view bicycle mirror assembly of claim 1 in which the first mounting foot is flexible and is capable of deforming to an outer profile of the first tube.

10. The rear view bicycle mirror assembly of claim 1 in which the first mounting foot is adapted to abut and mount against a down tube of the bicycle frame and the second mounting foot is adapted and arranged to abut and mount against a head tube of the bicycle frame.

11. The rear view bicycle mirror assembly of claim 1 further comprising strap means to secure the first mounting foot and/or second mounting foot to and in abutment with the respective frame tubes of a bicycle.

12. The rear view bicycle mirror assembly of claim 11 in which strap locating ports are defined within the mounting means through which the strap means pass.

13. The rear view bicycle mirror assembly of claim 11 in which the strap means comprise cable ties.

14. The rear view bicycle assembly of claim 1 in which the mounting body and mounting means is fabricated from a plastic material.

15. The rear view bicycle assembly of claim 14 in which the plastic material is a ABS.

16. The rear view bicycle assembly of claim 1 comprising a mirror housing within which the mirror is located.

* * * * *